US 6,744,521 B1

(12) United States Patent
Hertling et al.

(10) Patent No.: US 6,744,521 B1
(45) Date of Patent: Jun. 1, 2004

(54) METHOD FOR DETERMINING THE THICKNESS OF A MULTI-THIN-LAYER STRUCTURE

(75) Inventors: Rolf Hertling, Aachen (DE); Wolfgang Schaudig, Mönchengladbach (DE); Wilbert Windeln, Heinsberg (DE)

(73) Assignee: Steag Hama Tech AG (DE)

( * ) Notice: Subject to any disclaimer, the term of this patent is extended or adjusted under 35 U.S.C. 154(b) by 0 days.

(21) Appl. No.: 09/831,842

(22) PCT Filed: Nov. 6, 1999

(86) PCT No.: PCT/EP99/08534

§ 371 (c)(1),
(2), (4) Date: Aug. 21, 2001

(87) PCT Pub. No.: WO00/29808

PCT Pub. Date: May 25, 2000

(30) Foreign Application Priority Data

Nov. 12, 1998 (DE) .......................... 198 52 323

(51) Int. Cl.$^7$ ................................................ G01B 9/02
(52) U.S. Cl. ..................................................... 356/503
(58) Field of Search ......................... 356/503, 504, 356/630, 632, 650; 250/559.27, 559.29, 559.28

(56) References Cited

U.S. PATENT DOCUMENTS 5,587,792 A    12/1996   Nishizawa et al.
5,835,226 A    11/1998   Berman et al.
5,900,633 A     5/1999   Solomon et al.
6,281,974 B1 *  8/2001   Scheiner et al. ............ 356/491

FOREIGN PATENT DOCUMENTS

DE        42 28 870 A1    3/1994
JP         2000310512     11/2000
WO        WO 99/31483     6/1999

* cited by examiner

Primary Examiner—Frank G. Font
Assistant Examiner—Patrick Connolly
(74) Attorney, Agent, or Firm—Robert W. Becker & Associates; Robert W. Becker

(57) ABSTRACT

According to the inventive method for determining the thickness of at least one layer provided on a substrate, the measurement can be constructed simply and reliably and a reliable measuring result can be obtained by measuring reflection—and/or transmission light intensity values of zero order in dependence on the wavelength and calculating said reflection—and/or transmission light intensity values using an iteration model which is dependent on the individual layer parameters. The layer parameters are altered in order to introduce a consistency between the measured values and the calculated values and the substrates have geometrical structures whose geometrical dimensions are used as further parameters of the iteration model. The inventive method also provides a means of determining the geometry of structures in the substrate, for example the depth, width and the repetition interval of grooves in a blank for geometrical storage media, such as CDs.

9 Claims, 3 Drawing Sheets

METHOD FOR DETERMINING THE THICKNESS OF A MULTI-THIN-LAYER STRUCTURE

BACKGROUND OF THE INVENTION

The invention relates to a method for determining the thickness of at least one layer provided on a substrate.

When applying layers to a substrate, it is necessary that a certain layer thickness must be created or maintained. This is particularly true for the manufacture of storage media, in particular optical data storage media such as CDs, CD-Rs, DVDs, CD-RWs, DVD-RWs, MOs, and other data storage media to which different layers, such as information carrier layers, protective layers, or reflection layers, are applied. Known for measuring the layer thicknesses for quality control and during the production process are various layer thickness measurement processes, but these processes cannot be employed on grooved substrates. For determining groove geometry, reflection and/or transmission are measured for various orders of diffraction. However, such measurement processes with higher orders of diffraction of the light require more complex measurement equipment and calibration measures. It is not possible, or it is only possible with limited accuracy, to measure the layer thicknesses if the substrate itself has structures such as troughs that in optical storage media, for instance, are called grooves and that are required for writing, reading, and/or deleting data.

The object of the invention is therefore to create a method that provide a simple and reliable measurement process, provides reliable measurements for its control and regulation, in particular even during the layer application process, and also provides reliable measurements for substrates with structures contained therein or formed on the surface thereof, and that makes it possible to determine the structure geometry.

SUMMARY OF THE INVENTION

The object set forth is achieved in a method for determining the thickness of at least one layer provided on a substrate by measuring reflection and/or transmission light intensity values of zero order of diffraction as a function of the wavelength and by calculating the reflection and/or transmission light intensity values using an iteration model that depends on the individual layer parameters, whereby the layer parameters are modified to effect correspondence between the measured values and the calculated values, and whereby the substrates have geometric structures, the geometric dimensions of which are used as additional parameters of the iteration model.

In contrast to the conventional measurement processes, the inventive measures make it possible to correctly determine layer thicknesses, even of substrates with structures, as is the case, for instance, with CD blanks with grooves to which various layers must be applied, each layer having subsequently determined layer thicknesses, in order to manufacture optical data storage media. In addition, the method, and in particular the measurement device provided therefor, is very simple, because in the inventive method it is only necessary to measure the reflection/transmission light intensity values of the zero order of diffraction. This enables a very simple measurement arrangement that in particular can be used in the manufacturing process of, for instance, optical data carriers. Furthermore, calibrating the inventive method, in which only light values of zero order of diffraction are measured, is substantially less complex than in conventional processes. It is therefore possible to perform a wide variety of measurement processes with a single measurement device, as will be explained in more detail in the following.

In particular sample preparations are also no longer required with the inventive method, since the thickness of layers that are or will be applied to substrates with structures can be determined accurately and reliably. The process is therefore also particularly employable even during the manufacturing process, that is, it can be used in-line, since thickness measurements and controls are possible directly on the produced products, such as optical data storage media.

Thus, in accordance with the inventive method, the transmission light intensity values in reflection and/or transmission are measured spectrally, that is, as a function of the wavelength. These measurement values are then evaluated using optical calculations. This approach is to calculate the reflection and/or transmission light intensity values from optical models for a layer system and to vary in every calculation step the layer thicknesses and/or the spectral material parameters, e.g., the refraction indices (n) and/or the absorption indices (k) until the minimum deviation between measurement and calculation is achieved. Thus a layer thickness control is possible, and therefore monitoring of the optical properties of a layer system on a substrate with structures is possible, for instance for CDs with grooves.

In accordance with all of the preferred embodiments of the invention, interferences that occur due to the geometric structures are used for additional parameters. The inventive method in accordance with this embodiment is based on calculating inphase overlap of electromagnetic partial waves on the structures, for instance, on the grooves of the substrate or blank, and therefore on the interferences of these partial waves. By varying the parameters, the width and depth of the structures, for instance the channels or grooves, can be included in the measurement process. It is not possible to achieve optical consistency between measurements and calculation unless the structure parameters, the width, the depth, and/or the intervals between the structures or channels is consistent with that of the channels on the measured sample.

Due to the spectral dependence of the changes in the reflection and/or transmission light intensity values based on the structures, that is, the channels or grooves, compared to the light intensity values without structures, the information on the structure parameters, for instance the width, depth, and interval between channels or grooves, is already contained in the light intensity values of zero order of diffraction.

In accordance with a particularly advantageous embodiment of the invention, the geometric dimensions of the structures are determined, that is, for instance, the depth, width, and/or interval between channels or grooves. These geometric dimensions can be calculated preferably at the same time as the determination of the layer thicknesses. In this manner it is possible to monitor and control the quality of the molding process, for instance during production of optical storage media. For the special case in which no layers are applied to the substrate, that is, the layer thicknesses are zero, the measurement values for the geometric dimensions of the structures result, whereby it is thus possible to perform localized measurements of these geometric structures over the entire substrate surface in order thus to rapidly detect production errors during the production of substrates, for instance during injection molding of CD substrates.

In a very advantageous additional embodiment of the invention, the calculated data for the layer thicknesses and/or geometric structures are used for regulating production processes for applying at least one layer to a substrate and/or for developing substrate structures. The inventive method is particularly well-suited for in-line employment since in the inventive method only the light intensities of the zero order of diffraction need to be measured, and therefore neither the measurement apparatus nor the calibration is very complex, and since a wide variety of measurement options are possible with a single measurement apparatus, for instance layer thickness measurements alone or in combination with the geometric dimensions of the substrate structures, or the geometric dimensions of the substrate structures alone. This means that during production of the optical data carriers, for instance during the manufacture of substrates, when substrate structures are being developed, or during coating of the substrate with pre-specified layer thicknesses, the inventive method can be directly employed and can be used for regulating and controlling the production process. Thus the data calculated with the inventive method for the layer thicknesses and/or the substrate structure are used for subsequently determining the values for correcting variables in the production facility. In this manner the course of production can be automatically adjusted, controlled, and regulated.

In the case of production of optical data carriers such as CDs, the inventive methods are used directly on the produced products to determine the actual values. These actual values are then directly used to provide new correcting variables, such as sputter times, sputter rates, as well as pressures, temperatures, and gas flows during the production process in the production facility. The inventive method makes it possible to input target values into the production process, which values are then achieved via the closed loop. Since in the case of production of optical data media, in addition to the layer thicknesses, the groove geometries are also determined with the inventive method, in this manner the quality of the substrates or blanks with the geometric structures can also be controlled, that is the quality of the molding process can be controlled.

A special case for the inventive process is when the substrates do not have a geometric structure, that is, only the layer thicknesses are measured and/or regulated.

Preferably the substrates are blanks for data storage media such as CDs, whereby the geometric structures are formed as channels or grooves in the blank, and at least one information-carrying layer is applied to these blanks. The information-carrying layer is a preferably a metal alloy that can be modified by the energy from a beam of light between two phases. The information-carrying layer is preferably formed between two buffer layers.

BRIEF DESCRIPTION OF THE DRAWINGS

The invention is explained in more detail in the following using exemplary embodiments with respect to the figures.

DESCRIPTION OF PREFERRED EMBODIMENTS

Figure 1:
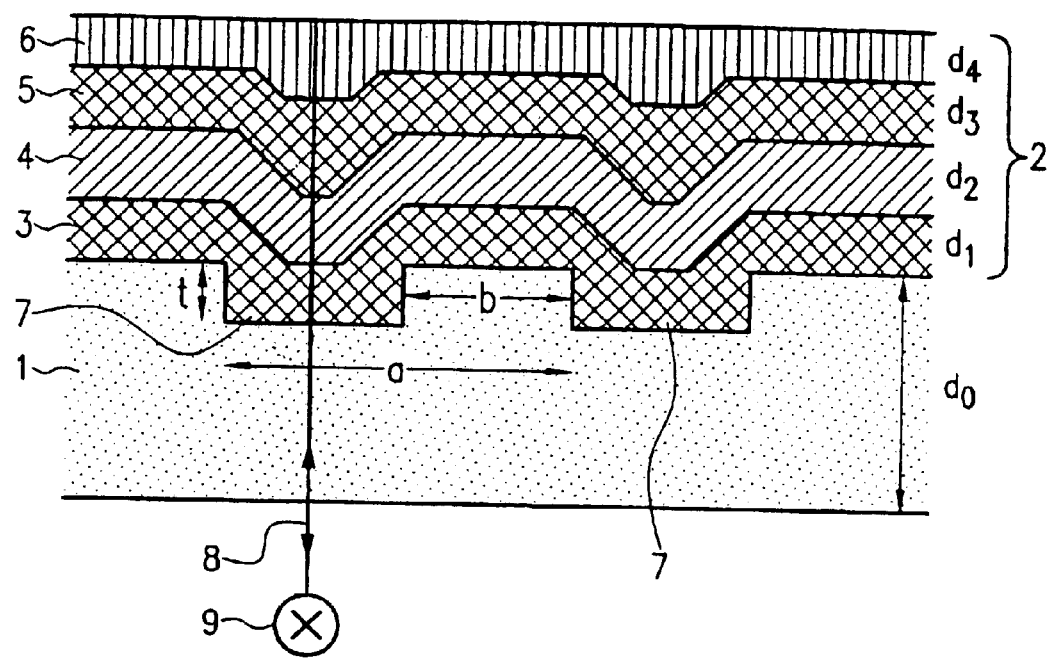
FIG. 1 is a schematic representation of an optical data storage medium, in which the inventive process is employed.

FIG. 1 illustrates the structure of a readable, erasable, and re-writable CD, also known as a CD-RW. The following layers of layer system 2 are applied by cathode sputtering in this order to a substrate 1 made of polycarbonate with the thickness $d_1$: a first buffer layer 3 made of a dielectric material and of a layer thickness $d_1$ that preferably comprises a metal oxide compound; an information-carrying layer 4, with the layer thickness $d_2$, that comprises a metal alloy and that can alternate between two phases by means of the energy of a laser beam and that is therefore also called a fast-change layer; a second buffer layer 5 with the layer thickness $d_3$ that is also dielectric and preferably comprises a metal oxide compound; a fourth layer 6 with a layer thickness $d_4$ that comprises a metal or a metal alloy and that draws off the energy from the laser beam that is required for writing. The two buffer layers 3 and 5 protectively enclose the information-carrying layer 4 and in addition optimally control the optical properties of the CD-RW with respect to intensity and phase difference of the reflectance between the written and unwritten condition. The layer thicknesses of the layers 3 through 6 in this exemplary embodiment have the following values: $d_1=96.0$ nm, $d_2=20$ to 25 nm, $d_3=24.0$ nm, and $d_4=100$ to 130 nm.

Formed in the substrate 1 are so-called grooves 7, whereby in the illustrated exemplary embodiment, for instance, their depth is $t=40$ nm, their width is $b=570$ nm, and their periodic interval a to each other $=1600$ nm.

The quality of such storage media depends largely on selecting and maintaining the correct layer thicknesses in the layer system 2 on the substrate 1. It is therefore necessary for the quality control and/or during the coating procedure in the in-line process to determine as precisely as possible the thicknesses of each of the individual layers 3 through 6. This is achieved using the inventive process, whereby a beam of light 8 from a light source 9 is directed perpendicular to the substrate 1 from the side of the substrate 1 facing away from the applied layer. During the measurement process the wavelength of the beam of light 8 directed onto the substrate is modified in a wavelength range of approximately 400 to 1100 nm.

Figure 2:
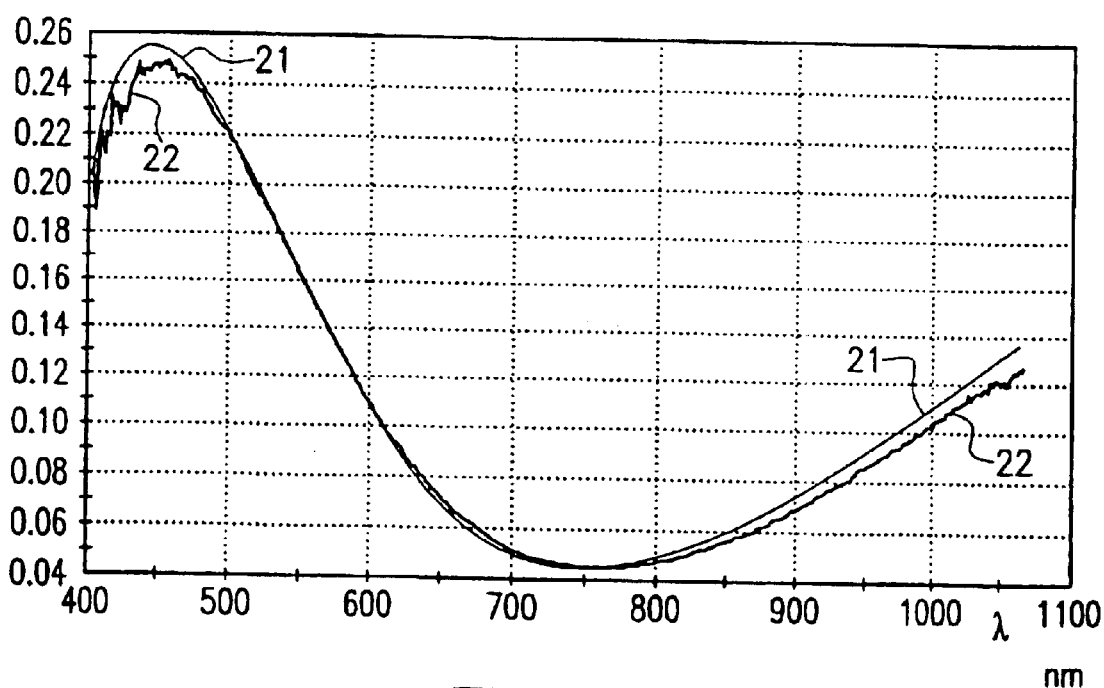
FIGS. 2 through 4 are diagrams in which the reflection light intensity values are applied over the wavelength; and, FIG. 5 is an exemplary embodiment for determining the locally analyzed dimensions of the substrate structures.

FIG. 2 illustrates a diagram in which the reflectance of a layer construction as illustrated in FIG. 1, for example, is shown as a function of the wavelength of the radiated light. In this exemplary embodiment, the substrate 1 is planar, that is, it does not have any grooves as shown in FIG. 1. The curve 21 represents the calculated reflectance and the curve 22 the measured reflectance. The reflectance is calculated from initially pre-specified optical models for a layer system. Then the layer thicknesses and/or the spectral material parameters, for instance the refractive index n or the absorption index k in the case of a transmission measurement, are varied with each calculation step until a minimum deviation is achieved between measurement and calculation, as shown in FIG. 2. Resulting from this process are the thicknesses of the layers 3 through 6, with $d_1=96.0$ nm, $d_2=20.1$ nm, $d_3=24.0$, and $d_4=130.0$ nm.

Figure 3:
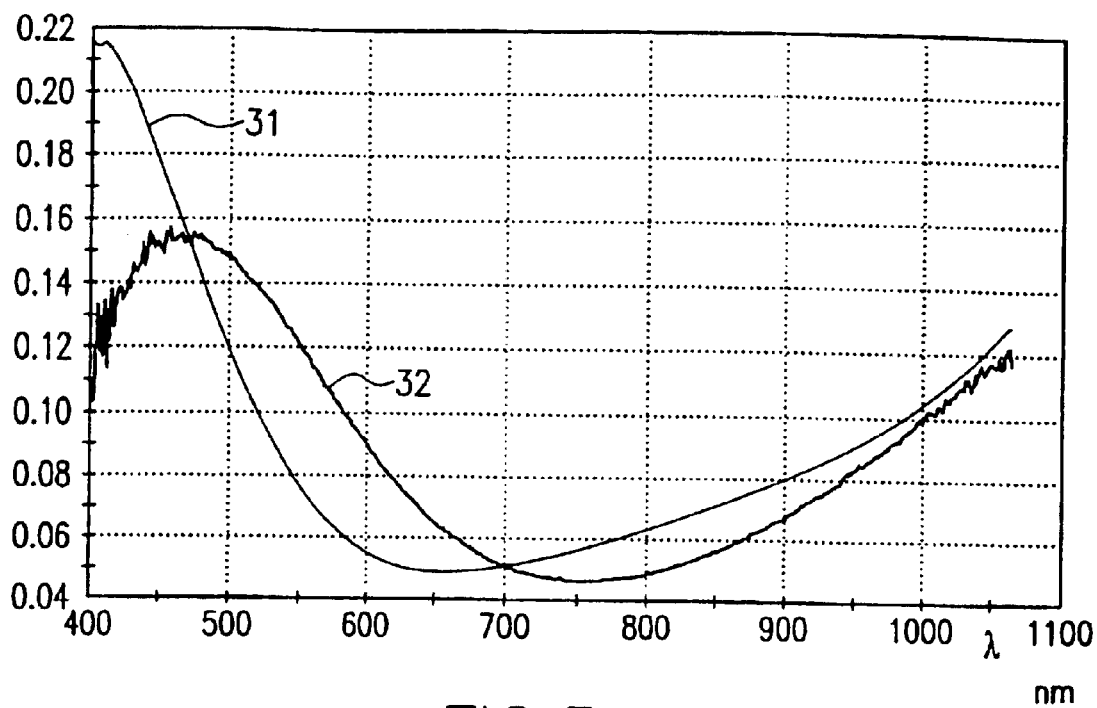

When this process described in the foregoing is applied to layer systems 2 that are or will be applied to substrates 1 with grooves or channels 7, this leads to incorrect and unacceptable results, as shown in FIG. 3. It Is no longer possible to obtain satisfactory consistency between calculated reflection values and the curve 32 for the measured reflection values of the curve 31.

In order to achieve satisfactory results and also to be able to measure reliably the layer thicknesses in layer systems on substrates with grooves, in accordance with the invention the light losses in perpendicular incidences on the sample are taken into account, whereby these light losses occur due to the grooves in the substrate. In accordance with the invention, preferably the inphase overlap of electromagnetic partial waves at the grooves are calculated, and thus their interference is calculated. Thus in this exemplary embodiment the width b and the depth t of the grooves 7 are also included in the variations of the parameters.

Figure 4:
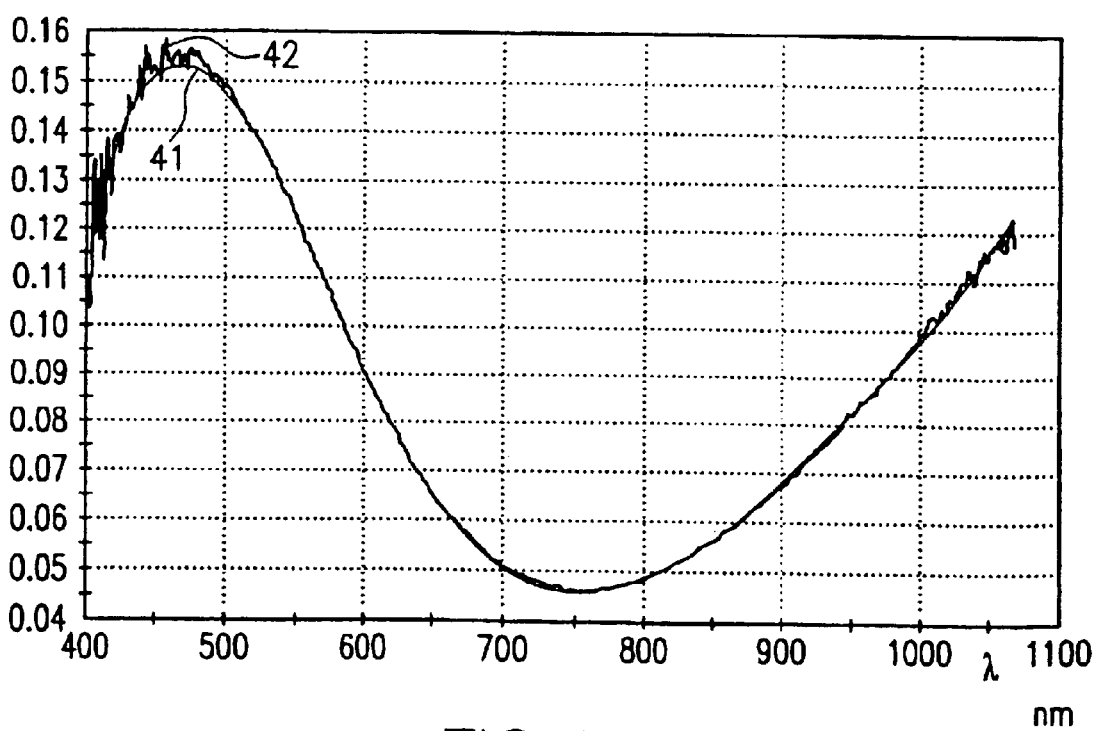

The consistency of the calculated reflection curve 41 with the measured reflection curve 42 that can be seen in FIG. 4, that is, the consistency between measurement and calculation, results when the width b and the depth t of the grooves 7 are consistent with the width b and the depth t of the groove on the measured sample.

In one exemplary embodiment, when the geometry of the grooves is not known, the inventive method is used to determine parameters in the layers 3 through 6 as follows: groove depth t=40.5 nm, groove width b=501.0 nm, and thicknesses $d_1$=95.0 nm, $d_2$=20.6 nm, $d_3$=22.9 nm, and $d_4$=130 nm.

In the exemplary embodiments for a layer system 2 for a CD-RW described in the foregoing, the layer 3 comprised ZnSSiox, layer 4 comprised AgInSbTe, layer 5 comprised ZnSSiox, and layer 6 comprised ALTi. These layers were located on a substrate or blank 1 that had grooves 7 and that comprised polycarbonate.

However, it is also possible to determine the groove geometry of the substrate initially independently from the layer thicknesses in order to learn the groove geometry. In accordance with this, first the layer thickness is measured in accordance with the inventive method. In the layer system used in the exemplary embodiment described in the foregoing, for the layers 3 through 6 when the groove geometry is known, where t=41 nm, b=485 nm, and a=1600 nm, the layer thicknesses are as follows in this order: $d_1$=96.5 nm, $d_2$=17.1 nm, $d_3$=21.3 nm, and $d_4$=100 nm.

In another exemplary embodiment, a layer system 2 as described in each of the two preceding embodiments is initially applied to a substrate without grooves and the layer thicknesses are pre-specified or measured with the values $d_1$=96.4 nm, $d_2$=20.1 nm, $d_3$=24.0 nm, and $d_4$=130 nm. In accordance with this, the same layer system is now applied to a substrate with grooves 7 using the now known sputter rates and the groove geometry is selected for the inventive method as free parameters, that is, the width b and the depth t of the groove are selected. In this manner it is possible to determine the groove geometry with the inventive method. When the layer thicknesses are as stated, when the measured and calculated reflection curves are consistent in accordance with FIG. 4, a groove depth that results is t=47.2 nm and the groove width that results is b=362.4 nm. In this embodiment of the method, the spectral information on the groove geometry, which information is contained in th reflectance, is reinforced by the applied layers.

In accordance with an additional exemplary embodiment of an inventive method, it is also possible to determine the groove geometry over the surface of an entire CD in a localized manner.

Figure 5:
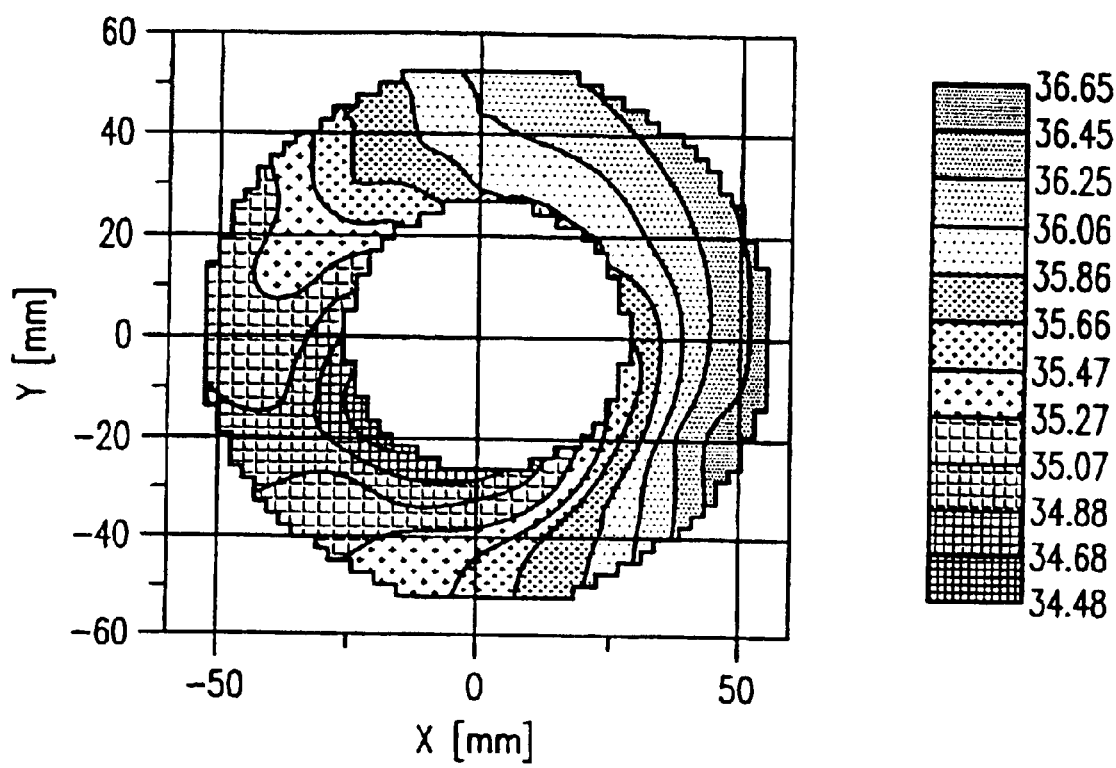

FIG. 5 illustrates one measurement result for determining the groove depth t over a polycarbonate blank that has grooves. No layers are applied to the blank. Based on the differences in the groove depths t over the surface of the substrate, it is possible to rapidly and simply identify production errors during the injection molding of the substrates or blanks.

The inventive method and a measuring device based on said method can be used with great advantage in production facilities for optical storage media. The reflection and/or transmission light intensity values are resolved spectrally, measured in the zero order of diffraction, and either the layer thicknesses and the groove geometry are calculated simultaneously therefrom or, if the groove geometry is known, the layer thicknesses are determined. When the actual values of the layer thicknesses calculated in this manner deviate from the target values, the values for the correcting variables in the production facility, for instance the sputter rate and/or the sputter time, can be subsequently determined or adjusted and forwarded to the production facility.

The invention was explained in the foregoing using preferred exemplary embodiments. However, for one skilled in the art, variations and embodiments are possible without departing from the inventive thought. It is also possible to employ the inventive method using transmission measurements instead of the reflection measurements used in the exemplary embodiments described in the foregoing.

The specification incorporates by reference the disclosure of German priority documents 198 52 323.8 of 12 Nov. 1998 and PCT/EP99/08534 of 6 Nov. 1999.

The present invention is, of course, in no way restricted to the specific disclosure of the specification and drawings, but also encompasses any modifications within the scope of the appended claims.

What we claim is:

1. A method for determining the thickness of at least one layer of a substrate that has geometric structures that lead to diffraction of light, including the steps of:

measuring at least one of the reflection and the transmission light intensity values of zero order of diffraction as a function of wavelength;

calculating the at least one of reflection and transmission light intensity values using an iteration model in which the individual layer parameters and the geometric dimensions of said geometric structures of said substrate are included as further parameters; and modifying the parameters to effect correspondence between the measured and calculated values.

2. A method according to claim 1, wherein geometric dimensions of said geometric structures of said substrate are determined.

3. A method according to claim 1, wherein at least one of calculated data for layer thicknesses and for said geometric structures are used for regulating production processes for at least one of applying at least one layer to a substrate and for developing substrate structures.

4. A method according to claim 1, wherein the substrates are blanks for data storage media.

5. A method according to claim 4, wherein said geometric structures are channels in said blank.

6. A method according to claim 1, wherein at least one layer is an information-carrying layer.

7. A method according to claim 6, wherein said information-carrying layer is a metal alloy that is modifiable by energy from a beam of light between two phases.

8. A method according to claim 6, wherein said information-carrying layer is formed between two buffer layers.

9. A method according to claim 1, wherein optical data storage media are used during manufacturing.

* * * * *